July 17, 1923.

A. T. KASLEY 1,461,852

DRIVING ARRANGEMENT FOR SHIPS

Filed March 29, 1921

A.T.Kasley
INVENTOR

D.C.Davis
BY
ATTORNEY

Patented July 17, 1923.

1,461,852

UNITED STATES PATENT OFFICE.

ALEXANDER T. KASLEY, OF ESSINGTON, PENNSYLVANIA, ASSIGNOR TO WESTING-HOUSE ELECTRIC AND MANUFACTURING COMPANY, A CORPORATION OF PENNSYLVANIA.

DRIVING ARRANGEMENT FOR SHIPS.

Application filed March 29, 1921. Serial No. 456,675.

*To all whom it may concern:*

Be it known that I, ALEXANDER T. KASLEY, a citizen of the United States, and a resident of Essington, in the county of Delaware and State of Pennsylvania, have invented a new and useful Improvement in Driving Arrangements for Ships, of which the following is a specification.

My invention relates to ship propulsion, more particularly of the electric type, and it has for its object to provide apparatus of the character designated which shall be light, powerful, and readily installed and which shall be efficient and durable in operation.

In the electrification of ships, particularly those already built and in which new power equipment is to be installed, it is desirable to have the power equipment so designed as to permit of its ready installation with as little alteration as possible in the ship structure and the retained mechanism. For example, in the application of the Diesel or high compression type of internal combustion engine to marine propulsion in ships which already have steam equipment employing either reciprocating engines or turbines, the propeller shaft and other mechanism are already positioned. The Diesel type of engine operates at a speed in excess of that which may be ordinarily and efficiently utilized by the usual propeller shaft and it is accordingly necessary to interpose some form of speed-reduction device between the crank shaft of the engine and the propeller shaft of the ship. To this end, I have devised an electrical driving motor which is located at any convenient distance above the crank shaft, the elevation of the motor above the crank shaft insuring that the motor will be kept out of the bilge water. By utilizing an electric motor of the rotating field and armature type, a driving mechanism may be had which is efficient in operation and which has large power capacity relative to its weight.

Apparatus embodying features of my invention is illustrated in the accompanying drawings forming a part of this application in which—

Figure 1:
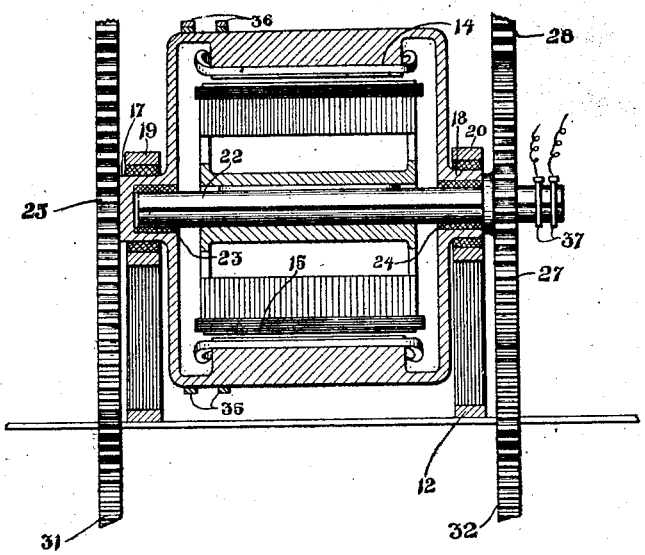
Figure 2:
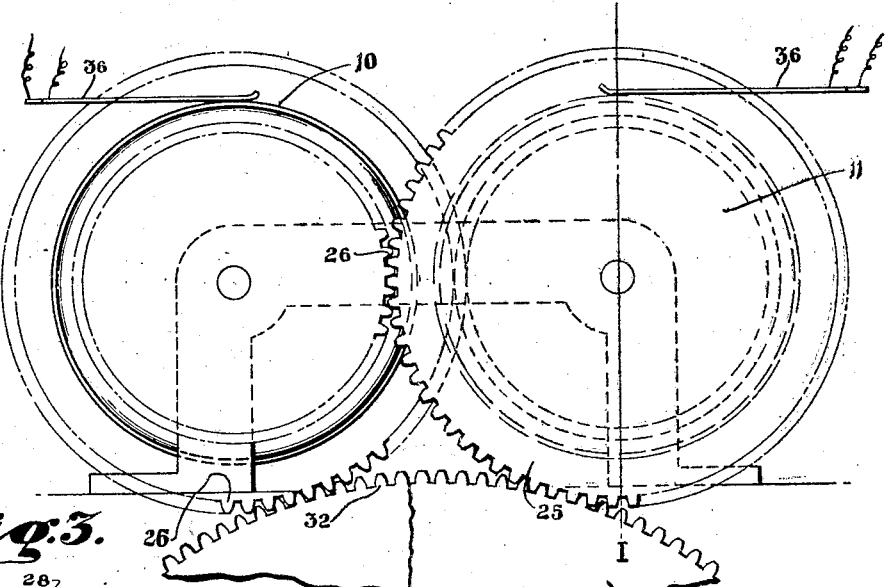
Figure 3:
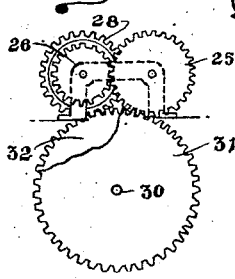

Fig. 1 is a sectional view along the line I—I of Fig. 2 of apparatus involving my invention; Fig. 2 is an end elevation thereof; and Fig. 3 is a diagrammatic view of my improvement.

In the drawings, two electric motors 10 and 11 are shown mounted upon any appropriate frame or support 12. The motors are mechanically connected to a propeller shaft 30, as will be more particularly hereinafter set forth. It will be seen from Figures 1 and 2 that the two motors 10 and 11 are shown as being supported a considerable distance above the propeller shaft.

Each motor comprises a rotatable field member 14 and rotatable armature 15. The field member is provided with projecting hubs 17 and 18 journaled in bearings 19 and 20 carried by the supporting structure 12. The armature member is mounted on a shaft 22 and the latter is journaled in bearings 23 and 24 carried by the projecting hubs of the field member.

The hub portion 17 of one field element carries a gear 25 meshing with a smaller gear 26 carried by the hub projection of the field element of the other motor. The shaft 22 of one armature element has secured thereto a gear 27 meshing with a larger gear 28 of the other motor. The small gears 26 and 27 and the large gears 25 and 28 are of the same size respectively. From this arrangement, it will be seen that the armature element of one motor must rotate in a direction opposite to that of the armature element of the other motor and the same is true concerning the field elements of the two motors.

The driven shaft 30, for example a propeller shaft, see Fig. 3, has connected thereto gears 31 and 32 meshing with the large gears 25 and 28, respectively, it being obvious that the latter gears rotate in the same direction. It will therefore be seen that the driven shaft 30 has power imparted thereto in the same direction from all of the rotating elements of the two motors.

The gearing employed results in equal relative speeds of the respective elements of the two motors and consequently allows for simple connections to a driven shaft. For example, if it is assumed that the meshing gears 25 and 26 rotate at 290 R. P. M. and at 310 R. P. M. respectively, and that the meshing gears 27 and 28 rotate at 310 R. P. M. and at 290 R. P. M., respectively, it will be seen that the relative rotation in each motor is 600 R. P. M., and, accordingly, substantially equal power is developed by and transmitted from each motor. The large gears 25 and 28 mesh with larger gears 31 and 32 carried by a propeller shaft 30 so that the latter may rotate at a suitable speed, for example 90 R. P. M.

The field members are provided with slip rings 35 having contact members or brushes 36 cooperating therewith to supply current thereto. Current is supplied to the armature elements through the slip rings 37 by means of contact members or brushes 38 in motors of the induction type, suitable commutators being provided if it is desired to employ motors of the commutating type.

It will be seen that the use of motors of the rotating field and armature type permits of the adoption of a unit of a relatively smaller size for the same power than would be possible with a unit of the ordinary type. It will furthermore be seen that the gearing employed permits of the unidirectional application of power to a propeller shaft from all of the rotating elements of the motors and of the location of the propeller shaft at any desired distance below the motors.

My invention comprises a combined electrical and mechanical transmission device which may be readily installed in new ships, or old ships undergoing reinstallation of propulsion machinery, and is peculiarly adapted for use in connection with generators driven by Diesel or other internal combustion engines. The transmission unit is so designed as to permit of its ready application to any ship structure and has the motors thereof so located as to be well above the propeller shaft thereby avoiding injury of the electrical elements by the bilge water.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. In a ship propulsion arrangement, the combination of two motors arranged side by side, each motor having oppositely rotating field and armature elements, pairs of meshing gears carried by the rotating elements of the motors at the ends of the latter, a propeller shaft, and gears carried by the propeller shaft and meshing respectively with one of the gears of each of the pairs.

2. In a power installation, the combination of a pair of electric motors, each having oppositely rotating field and armature elements, meshing gears of different sizes connected to the field elements of the motors, meshing gears of different sizes connected to the armature elements of the motors, a driven element, and gears carried by the driven element and meshing with the larger gears of the meshing gears.

3. In a power installation, the combination of a pair of motors, each motor having oppositely rotating field and armature elements, a pair of oppositely rotating meshing gears for connecting the field elements, a pair of oppositely rotating meshing gears for connecting the armature elements, a driven element, and gears carried by the driven element for meshing with gears of said pairs rotating in a like direction.

4. In a power installation, the combination, of a pair of electric motors, each having rotating field and armature elements, a large gear carried by the field element of one motor meshing with a small gear carried by the field element of the other motor, a small gear carried by the armature element of the first motor meshing with a large gear carried by the armature element of the other motor, a driven shaft, and gears carried by the driven shaft and meshing with said large gears.

5. In a power installation, the combination of a pair of electric motors, each having oppositely rotating field and armature elements, large gears of like size connected to the armature element of one motor and the field element of the other motor, small gears of like size connected to the field element of one motor and the armature element of the other motor and meshing with the large gears, a driven element, and gears carried by the driven element and meshing with the large gears.

In testimony whereof, I have hereunto subscribed my name this 24th day of March, 1921.

ALEXANDER T. KASLEY.